United States Patent [19]

Takeoka et al.

[11] Patent Number: 4,735,888
[45] Date of Patent: Apr. 5, 1988

[54] INFORMATION RECORDING MEDIUM AND MANUFACTURING METHOD THEREOF

[75] Inventors: Yoshikatsu Takeoka; Norio Ozawa, both of Kawasaki; Nobuaki Yasuda, Zushi, all of Japan

[73] Assignee: Kabushiki Kaisha Toshiba, Kawasaki, Japan

[21] Appl. No.: 824,098

[22] Filed: Jan. 30, 1986

[30] Foreign Application Priority Data

Feb. 4, 1985 [JP] Japan .................................. 60-19402
Oct. 11, 1985 [JP] Japan ................................. 60-226277

[51] Int. Cl.⁴ .......................... G03C 1/72; G11B 7/24; B41M 5/24
[52] U.S. Cl. .................... 430/270; 430/346; 430/495; 430/945; 430/964; 346/135.1
[58] Field of Search ............... 430/270, 945, 964, 346, 430/495; 346/135.1

[56] References Cited

U.S. PATENT DOCUMENTS

| | | | |
|---|---|---|---|
| 3,971,874 | 7/1976 | Ohta et al. | 420/432 |
| 4,188,214 | 2/1980 | Kido et al. | 430/494 |
| 4,328,303 | 5/1982 | Ronn et al. | 430/290 |
| 4,388,400 | 6/1983 | Tabei et al. | 430/346 |
| 4,433,340 | 2/1984 | Mashita et al. | 346/135.1 |
| 4,478,768 | 10/1984 | Takeoka et al. | 264/1.4 |
| 4,496,957 | 1/1985 | Smith et al. | 430/945 |

FOREIGN PATENT DOCUMENTS 0023102  1/1981  European Pat. Off. .

*Primary Examiner*—Paul R. Michl
*Assistant Examiner*—Lee C. Wright
*Attorney, Agent, or Firm*—Oblon, Fisher, Spivak, McClelland & Maier

[57] ABSTRACT

A disk-shaped recording medium of the invention has a photosensitive recording layer formed on a substrate. Tellurium oxide clusters are dispersed in a hydrocarbon matrix of the recording layer so as to thermally stabilize the matrix. Tellurium clusters are dispersed in the matrix which is thermally stabilized by dispersion of the tellurium oxide clusters. The recording layer has excellent oxidation and heat resistance. The recording medium is manufactured by a plasma sputtering technique.

14 Claims, 5 Drawing Sheets

INFORMATION RECORDING MEDIUM AND MANUFACTURING METHOD THEREOF

BACKGROUND OF THE INVENTION

The present invention relates to an optical information recording medium on or from which a user can record or reproduce information and, more particularly, to a read/write optical disk having a photosensitive recording layer which is deformed in a beam irradiation area in response to an input light beam modulated to represent recording information and a method of manufacturing the same.

Optical disks on or from which information can be recorded or reproduced by the user are becoming increasingly important as optical information recording media capable of storing a large volume of information and allowing extraction of desired information by random access. In general, in optical disks of this type a hole called a "pit" is formed in a photosensitive recording layer to store data in response to an input laser beam (called a "write beam") modulated to represent information to be recorded. In the data read mode, the pit portion of the medium is continuously irradiated with a laser beam of a predetermined intensity (weaker than a write beam and called a "read beam") so as to reproduce desired information.

Since semiconductor lasers having relatively low power ratings in the vicinity of 20 mW have been used in recent optical disks, low-melting-point metals such as Te, In, Bi, Pb, As or Se are preferable as recording layer metals. However, recording layers of low-melting-point metals have poor oxidation resistance and naturally corrode over a long period of time. When optical disks are left exposed to the air over a long period of time, the recording layer reacts with water and oxygen contained in the air to form an oxide, which significantly degrades the basic functioning of the recording layer. Thus, optical disks having recording layers of low-melting-point metals also have short lives.

When a recording layer comprises a tellurium-carbon (Te-C) film having an extremely high oxidation resistance, the oxidation resistance of the recording layer can be improved and the life of the disk prolonged. A Te-C film has an extremely high oxidation resistance since Te particles in the recording layer are uniformly dispersed in a hydrocarbon matrix. More specifically, the hydrocarbon matrix serves as an oxidation inhibitor for Te particles and improves the oxidation resistance of the recording layer. Empirically, the basic functioning of this recording layer is not substantially degraded even if the layer is left exposed to severe conditions for over 1,000 hours (e.g., at a temperature of 70° C. and a relative humidity of 85%). This indicates that an optical disk having such a recording layer has a life of about 150,000 hours (17 years).

However, an improved optical disk of this type suffers from the problem of low heat resistance. This is attributable to the poor heat resistance of the hydrocarbon matrix. The recording layer of an optical disk is subject to irradiation not only with a write beam for information recording but also with read beams of several different access schemes. In one of the typical schemes, the recording track is traced continuously in a spiral. According to another scheme, the same data is read by jumping to a traced track. In either scheme, continuous irradiation by the read beam results in a rise in temperature in the recording layer. The temperature increase is greater in the latter scheme than the former scheme. When the increase exceeds a given characteristic temperature determined by the type of recording layer used, the layer is subject to deterioration.

In order to prevent such thermal deterioration, the following countermeasures can be taken. When the former access scheme is adopted, the intensity of the read beam is reduced so that the temperature of the recording layer is kept below the characteristic temperature. When the latter access scheme is adopted and a single track is continuously read more than a predetermined number of times, the read beam is automatically returned to its initial position at the center of the disk.

However, since the CNR (carrier-to-noise ratio) of the reproduced signal is proportional to ½ the power of the intensity of the read beam, a decrease in read beam intensity leads to a degradation in the CNR. The method of resetting the read beam to the initial position at the center of the disk, on the other hand, causes an increase in data access time. In other words, either method can only be adopted at the cost of the performance of the optical disk.

SUMMARY OF THE INVENTION

It is therefore an object of the present invention to provide a new and improved optical information recording medium in which a recording layer has excellent oxidation and heat resistance, and a method of manufacturing the same.

The optical information recording medium of the present invention has a photosensitive recording layer formed on a substrate. The recording layer consists of a hydrocarbon matrix in which low-melting-point metal clusters such as tellurium clusters are uniformly dispersed. Since the hydrocarbon matrix is electrochemically immune, it serves an an oxidation inhibitor for the metal clusters. Therefore, the recording layer has excellent oxidation resistance. Metal oxide clusters such as tellurium oxide clusters are also uniformly dispersed in the matrix and thermally reinforce the matrix. In other words, low-melting-point metal clusters are dispersed in a matrix which is thermally stabilized by dispersion of metal oxide clusters. For this reason, the recording layer has excellent oxidation and heat resistance.

The optical information recording medium according to the present invention is manufactured by plasma sputtering. A substrate and a target of a low-melting-point metal are placed opposing each other in a closed space filled with a mixture of a plurality of selected gases. RF power is applied to the substrate and target in this state to perform plasma sputtering and form on a substrate a recording layer with the structure described above with ease and high efficiency.

BRIEF DESCRIPTION OF THE DRAWINGS

The present invention is best understood by reference to the accompanying drawings, in which.

DETAILED DESCRIPTION OF THE PREFERRED EMBODIMENTS

Figure 1:
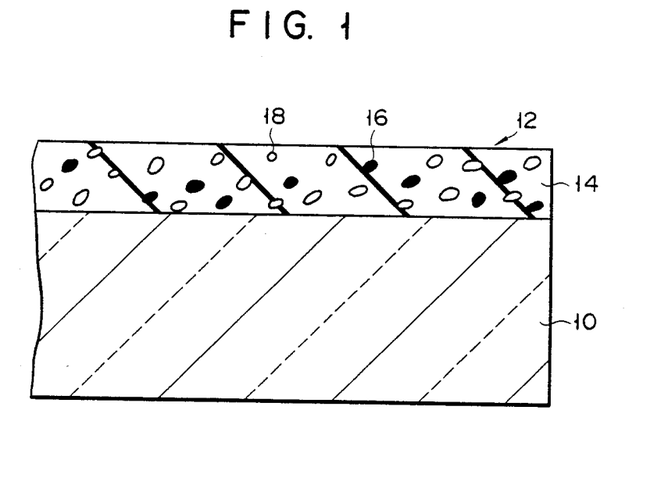
FIG. 1 is a diagram (not drawn to scale) showing a sectional structure of an optical disk according to a preferred embodiment of the present invention.

Referring now to FIG. 1, disk-shaped substrate 10 is made of a transparent material such as polycarbonate, acryl or epoxy resin, or the like. Photosensitive recording layer 12 is formed on substrate 10. Layer 12 has organic matrix 14 of hydrocarbon. Low-melting-point metal clusters 16 and low-melting-point metal oxide clusters 18 are contained in matrix 14. In order to facilitate visual understanding of the structure of layer 12, clusters 16 are indicated by black dots and clusters 18 are indicated by white dots in FIG. 1.

Low-melting-point metal clusters 16 are selected from metals having a high recording sensitivity when recording layers consist of only such metals. In this embodiment, clusters 16 are Te clusters. The poor corrosion resistance of Te can be overcome by dispersing Te clusters in hydrocarbon matrix 14. Since hydrocarbon matrix 14 is electrochemically immune, the corrosion reaction of Te clusters does not progress into the recording layer. Thus, the hydrocarbon matrix serves as an oxidation inhibitor for Te clusters.

Hydrocarbon matrix 14 is selected from substances which can be synthesized in a plasma, are stable in a plasma, and can be formed into thin films.

Metal oxide clusters 18 are selected from metal oxides which have melting points higher than that of clusters 16 but not so high as to interfere with the formation of pits by laser beam irradiation. A typical example of such an oxide is an oxide of the metal used for clusters 16. The intended function of clusters 16 is to improve heat resistance of the recording layer by dispersion in the hydrocarbon matrix. The heat resistance of the recording layer can be improved by roughly two mechanisms. The first mechanism is as follows. The thermal conductivity of clusters 16 is generally 10 to 100 times that of matrix 14. Therefore, a recording layer having clusters 16 dispersed therein according to the present invention has a thermal conductivity higher than that of a conventional recording layer without such clusters. When the thermal conducutivity is high, the quantity of heat flowing into the substrate is large, and the rise in temperature in the recording layer is accordingly decreased. In the second mechanism, propagation of the thermal deterioration reaction of the hydrocarbon matrix is prevented and eliminated. This effect is obtained since the melting point of the metal oxide clusters is sufficiently higher than the melting point or boiling point of the hydrocarbon matrix.

It should be noted that an oxide of the metal used for clusters 16 is used for the other clusters 18. In the embodiment shown in FIG. 1, since Te is used for clusters 16, Te oxide ($TeO_2$) clusters 18 are dispersed in matrix 14. When recording layer 12 is as thin as 5 to 250 nm, the size of the Te or $TeO_2$ clusters is set to be about 2 to 250 nm so as to provide satisfactory resolution.

The number of Te atoms ($N_{Te}$) contained in recording layer 12 is set to be larger than the number of C atoms ($N_C$) in matrix 14. In the embodiment shown in FIG. 1, the ratio of Te atoms to C atoms is set to be 2-6 to 1. With this ratio, excellent oxidation resistance and recording sensitivity can be obtained for recording layer 12. In addition, the molar ratio $M(TeO_2)/M(Te)$ of clusters 18 to 16 in recording layer 12 is set to be 0.1-1.2 to 1.

Figure 2:
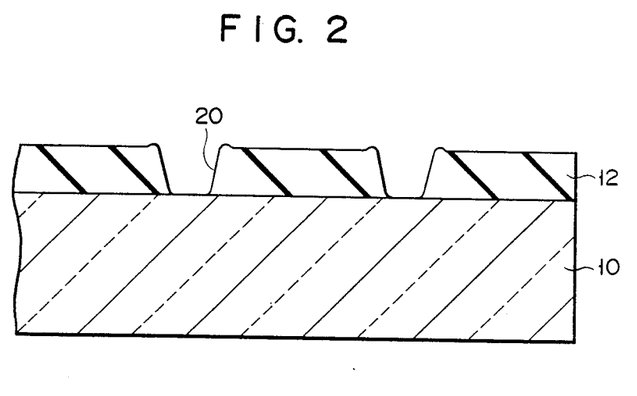
FIG. 2 is a diagram (not drawn to scale) showing a sectional structure of the optical disk shown in FIG. 1 when it is irradiated with a write beam to form information storing pits in the recording layer.

When recording layer 12 is irradiated with a write laser beam pulse-modulated to represent predetermined information, metal clusters 16 contained therein absorb the beam energy and generate heat. Upon this, the hydrocarbon matrix evaporates and the metal clusters melt. As a result, as shown in FIG. 2, holes 20 called pits are formed in the laser irradiated region of layer 12.

After information is recorded on an optical disk in the above-mentioned manner, it can be reproduced or read by a read laser beam. The laser power or intensity of the read beam is set to be about 1/5 to 1/10 that of the write beam. When pit 20 of layer 12 is irradiated with the read beam, the intensity of reflected light between the pit and flat portions of layer 12 is different. When this difference in intensity of reflected or transmitted light is detected by a known optical detection unit (not shown), the original information represented by pit 20 can be reproduced. Since matrix 14 is thermally stabilized by mixing in metal oxide clusters 18 according to the present invention, the intensity of the read beam can be set at a desirable high level. The carrier-to-noise ratio (known as the CNR) of the reproduced signal is proportional to $\frac{1}{2}$ the power of the beam intensity. Therefore, when the beam intensity is increased, the CNR of the reproduced signal can be increased, thereby allowing satisfactory information reproduction.

In the optical disk according to the present invention, since the heat resistance of recording layer 12 is improved, the data access speed can be improved significantly. This is because the laser head (not shown) need not be reset to the initial position upon each data access as in a conventional system in order to prevent continuous irradiation of layer 12 with the read beam. Even if layer 12 is irradiated with the beam throughout the data read mode, it does not experience any thermal deterioration since it has excellent heat resistance. Therefore, the life of the optical disk is prolonged, and its basic functioning is improved. An improvement in the heat resistance of layer 12 also leads to improvements in various characteristics such as tracking and focusing.

As shown in FIG. 1, an optical disk of the present invention having matrix 14 with metal clusters 16 and metal oxide clusters 18 dispersed therein and having excellent oxidation and heat resistance can be easily manufactured by sputtering.

Figure 3:
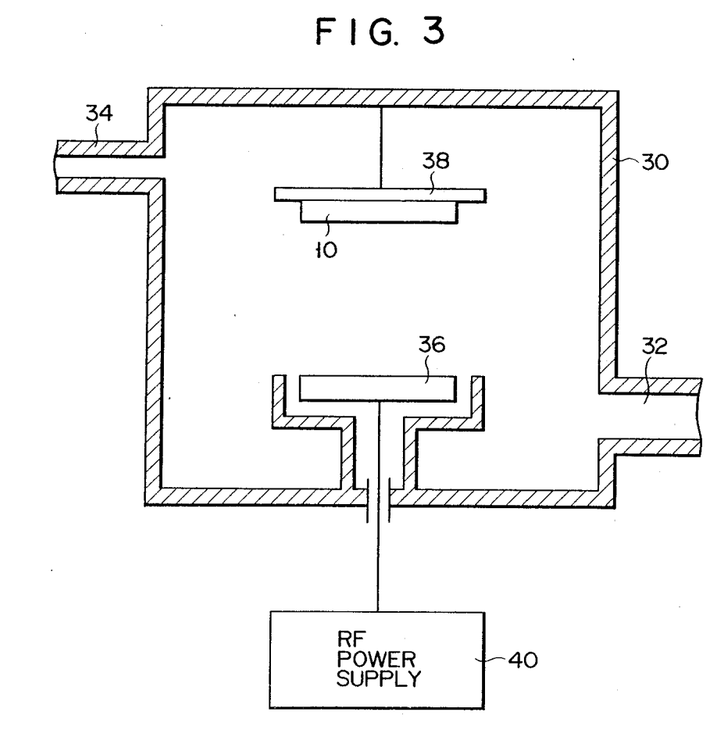
FIG. 3 is a diagram schematically showing a sectional structure of a plasma sputtering apparatus used for manufacturing the optical disk shown in FIG. 1.

In the plasma sputtering apparatus shown in FIG. 3, the interior of container 30 is evacuated through evacuation port 32 by a known vacuum pump (not shown) and is placed in a vacuum. Container 30 has gas inlet 34. Two electrodes 36 and 38 are placed opposing each other in container 30. One electrode 36 is a target electrode connected to a target plate of a low-melting-point metal (e.g., Te) the same as that of the clusters 16 contained in matrix 14. RF voltage generator 40 applies RF power to electrode 36, cathode. The other electrode 38 serves as a holder for optical disk substrate 10. Thus, substrate 10 is placed on electrode 38, anode.

When a recording layer is formed on substrate 10, the interior of container 30 is evacuated to a pressure of about $10^{-6}$ Torr through port 32. Thereafter, a gas mixture of oxygen and an alkyl hydrocarbon (e.g., $CH_4$) is supplied at a pressure of about $10^{-2}$ Torr. When the alkyl hydrocarbon is $CH_4$, the mixing ratio of oxygen to $CH_4$ is set to fall between 10:90 (inclusive) and 70:30 (exclusive).

Then, RF power (13.56 MHz) of 200 W is applied from RF power supply 40 to the Te target to produce a plasma. Upon this step, a recording layer is deposited on substrate 10 on counter electrode 38. It is to be noted that the substrate is preferably rotated by a known method during film deposition.

$C_2H_6$, $C_3H_8$ or the like can be used in place of $CH_4$ as the alkyl hydrocarbon in the sputtering gas. However, in order to improve the deposition rate, a lower hydrocarbon is preferable. In addition, a rare gas such as Ar can be mixed with a gas mixture of an alkyl hydrocarbon and oxygen in order to improve the deposition rate. However, the content of the rare gas used should not exceed the total content of the alkyl hydrocarbon and oxygen.

Provided that the contents of the alkyl hydrocarbon and oxygen are given, the thickness of the recording layer formed on substrate 10 is determined mainly in consideration of the desired recording sensitivity. The thickness of the recording layer is preferably 5 to 250 nm and more preferably 10 to 150 nm. When the recording layer is too thin (i.e., has a thickness below 5 nm), its light absorbancy is lowered. On the other hand, when the recording layer is too thick (i.e., has a thickness of 250 nm or more), the thermal load for forming pits is increased. In either case, recording sensitivity is degraded.

As has been described above, an optical disk according to the present invention can be manufactured effectively without changing the basic steps in a conventional plasma sputtering method. In the optical disk of the present invention, metal clusters 16 and metal oxide clusters 18 can be uniformly dispersed in recording layer 12. The contents of clusters 16 and 18 can be accurately controlled by setting the gas composition in container 30. Therefore, the hardware of the apparatus for manufacturing optical disks need not be changed. This means that the conventional manufacturing systems of optical disk manufacturers can be used to manufacture optical disks having excellent oxidation and heat resistance, thereby providing a great industrial advantage.

Figure 4:
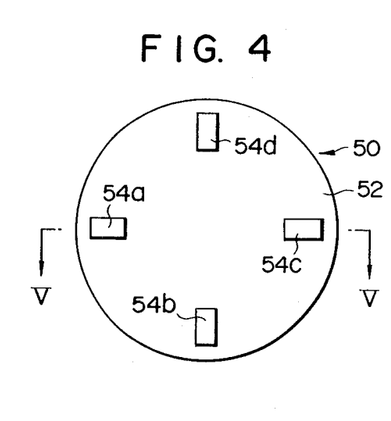
FIG. 4 is a plan view of a composite target used for manufacturing the optical disk shown in FIG. 1 by another method.
Figure 5:
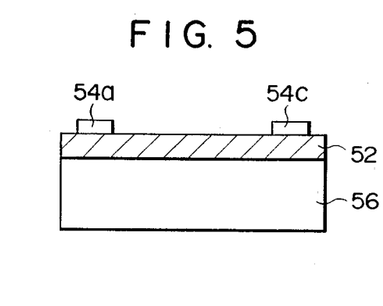
FIG. 5 is a diagram showing a sectional structure of the target shown in FIG. 4 along a line V—V therein.

An optical disk of the present invention can also be manufactured by another method to be described below. According to this method, composite target plate 50 as shown in FIGS. 4 and 5 is used as a plasma sputtering target. Plate 50 has base layer 52 of a low-melting-point metal (Te in this case), just as metal clusters 16 contained in matrix 14. A plurality of metal pellets 54 are arranged on base layer 52. Pellets 54 consist of a substance ($TeO_2$ in this case) which is the same as that constituting clusters 18 in matrix 14. FIG. 5 shows a sectional structure of plate 50 in FIG. 4 along a line V—V therein. Plate (called backing plate) 56 is formed on the rear surface of layer 52.

The number of pellets 54 is determined by the desired contents of clusters 16 and 18 in recording layer 12. In this embodiment, in order to set predetermined contents for clusters 16 and 18, four metal pellets 54a to 54d are arranged. Pellets 54a to 54d are arranged in a cross-like manner so as to obtain uniform quality for recording layer 12.

When an optical disk of the present invention is manufactured using target 50, the gas in container 30 can be a gas mixture of argon and methane in place of a gas mixture of oxygen and methane. In that case, an optical disk, wherein clusters 16 and 18 are uniformly dispersed in recording layer 12, can be manufactured with high efficiency.

Several actual examples practicing the idea of the present invention will be described below. The following examples demonstrate the high oxidation and heat resistance of optical disks manufactured according to the present invention.

EXAMPLE 1

A recording layer was deposited on a 1.5 mm thick acrylic substrate using a DC magnetron sputtering apparatus and a Te target having a diameter of 125 mm. The pressure during sputtering was $5 \times 10^{-3}$ Torr and the application power was 120 W. Recording layers were formed with the following mixing ratios of oxygen to $CH_4$: 10/90, 20/80, 30/70, 40/60, 50/50, and 60/40. Each recording layer was deposited to a thickness of 50 nm. As a Comparative Example, an information recording medium was manufactured with a recording layer formed by sputtering in an atmosphere containing only $CH_4$ and no oxygen.

The upper limit of the laser beam intensity which can be continuously radiated (maximum allowable beam intensity) was determined for each information recording medium in the Examples and the Comparative Example. The upper limit increased with an increase in the content of oxygen in the information recording media of the Examples, wherein recording layers were formed by sputtering in a gas mixture of oxygen and $CH_4$ (See FIG. 6). Even in an information recording medium having a recording layer formed in a gas mixture with a minimum oxygen content of 10%, an upper limit 20% higher than that of the Comparative Example was obtained. When the oxygen content was 60%, the maximum upper limit was 2 times that of the Comparative Example. As can be seen from these results, the upper limit of the laser beam intensity which can be radiated onto the recording layer of an optical disk of the present invention is increased since the hydrocarbon matrix is thermally stabilized by the addition of $TeO_2$ clusters.

EXAMPLE 2

Figure 7:
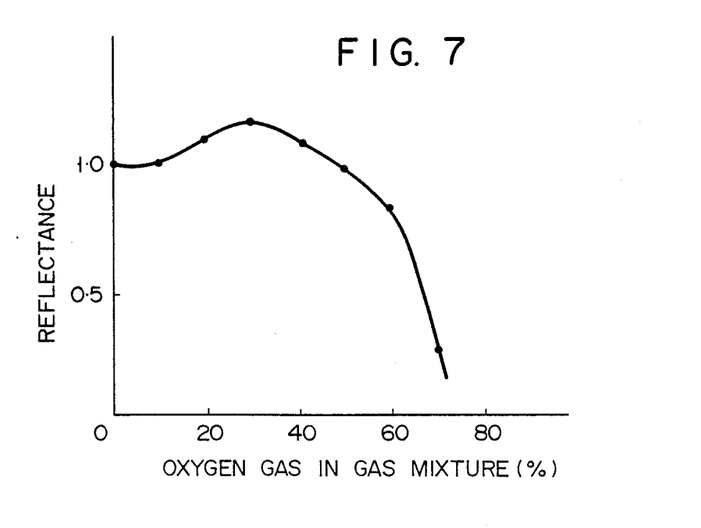
FIG. 7 is a graph showing the relationship between the composition of the gas mixture for plasma sputtering and the reflectance of the laser beam by the recording layer of an optical disk actually manufactured.

FIG. 7 shows the relationship between the reflectance of a recording layer and the oxygen content in information recording media of the present invention manufactured under the same sputtering conditions with various mixing ratios of oxygen and $CH_4$. A 1.5 mm thick acrylic substrate was used as a substrate, the thickness of the recording layer was 70 nm, and the wavelength of the radiation laser beam was 830 nm. The value of reflectance is normalized with reference to the value of a recording layer formed by sputtering in a gas consisting of only $CH_4$. When the oxygen content is 10 to 60%, the reflectance is 0.7 to 1.2, which is preferable. When the oxygen content is 70%, reflectance is decreased to 0.3 and recording sensitivity is significantly lowered. In this case, pits could not be formed with a semiconductor laser beam having an energy of 10 mW×500 nsec. When the oxygen content was 10 to 60%, recording layers could have excellent recording performance; reproduced signals having a contrast ratio of 0.4 or more could be obtained with a laser beam having an energy of 10 mW×30 nsec. Thus, information recording media of the present invention having recording layers obtained by plasma sputtering in a gas mixture of oxygen and a methane hydrocarbon at a desirable mixing ratio have recording sensitivities equivalent to media having recording layers formed by plasma sputtering in a gas containing only a methane hydrocarbon.

When an information recording medium obtained by the method of the present invention was placed in a thermostat kept at 70° C. and 85% RH so as to examine oxidation resistance, an excellent result (a decrease in reflectance of 1% or less) was obtained. This level of oxygen resistance is equivalent to that of a recording layer comprising a Te-C film formed by a conventional method.

Figure 8:
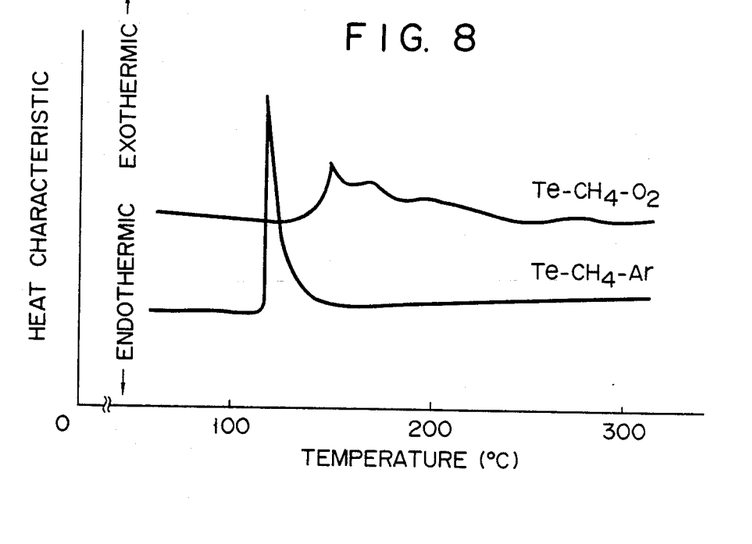
FIG. 8 is a graph showing results of differential thermal analysis of a recording layer of an optical disk manufactured by a method according to the present invention.

In order to examine the heat resistance of the recording layers of information recording media manufactured following the same procedures as in Example 1 in more detail, differential thermal analysis (DTA) was performed for powders prepared by peeling recording layers from substrates. FIG. 8 shows the analysis results. The recording layers analyzed were formed in the above-mentioned manner, and the oxygen content of the sputtering atmosphere was set at 50%. As a Comparative Example, an information recording medium having a recording layer formed by sputtering in a gas mixture of Ar and $CH_4$ was prepared. In the recording layers of the media in Example 2, the peak exothermic temperatures increased and the exothermic reaction was more moderate than that of the medium of the Comparative Example. In other words, the recording layers of information recording media manufactured by the method of the present invention had improved heat resistance.

Seven recording layers formed on substrates following the same procedures as in Example 1 were measured for their X-ray photoelectron spectra (XPS). The X-ray photoelectron spectra of the layers were measured so as to examine the bonding state of Te atoms in the layers. In all of the recording layers, Te was present in two forms: metal (573 eV) and ions ($Te^{4+}$; 576 eV). This indicates that both Te and $TeO_2$ are present in each recording layer. Similar measurement was also performed for a recording layer formed using 100% hydrocarbon gas as a plasma sputtering gas. In this case, no $Te^{4+}$ was observed. The above results reveal that $TeO_2$ is distributed in recording layers if such recording layers are formed by plasma sputtering in a gas mixture of oxygen and hydrocarbon.

Figure 6:
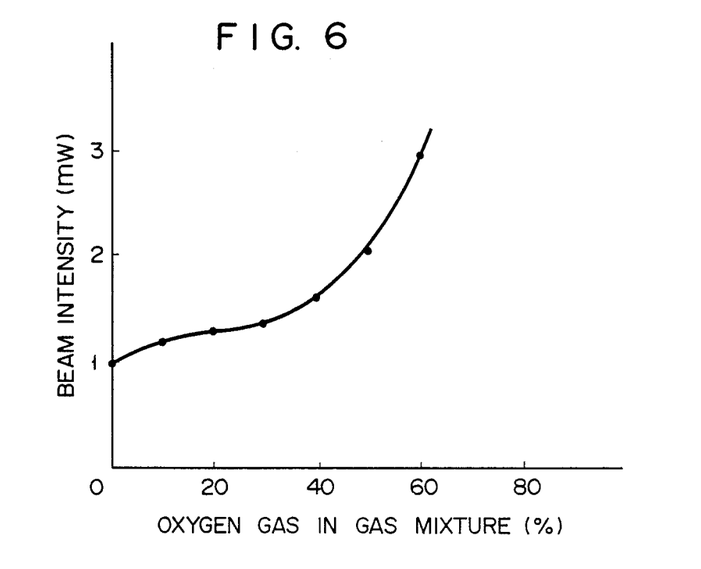
FIG. 6 is a graph showing the relationship between the composition of a gas mixture and the upper limit of the intensity of a laser beam emitted onto an optical disk according to the present invention when the disk is manufactured by plasma sputtering in a gas mixture consisting of hydrocarbon and oxygen.
Figure 9:
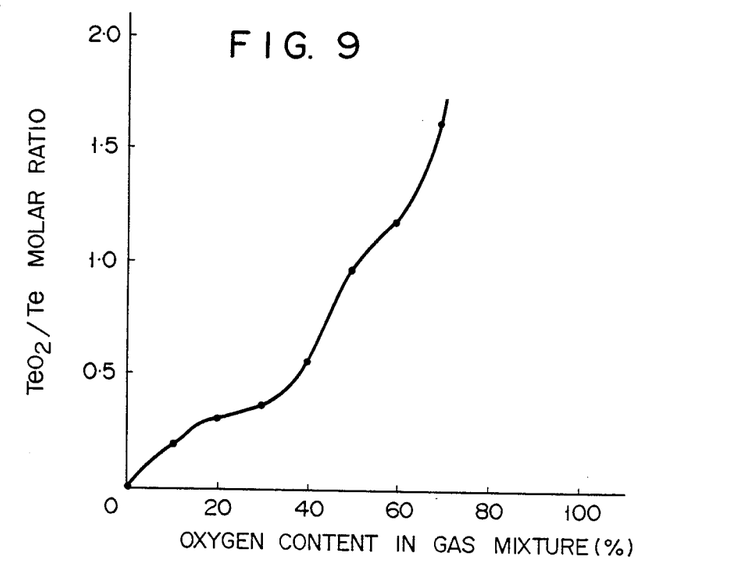
FIG. 9 is a graph showing the relationship between the composition of the gas mixture for plasma sputtering and the molar ratio of $TeO_2$ cluster content to Te cluster content in an optical disk actually manufactured.

FIG. 9 shows the relationship between the oxygen content of the gas mixture and the molar ratio of $TeO_2$ to Te contained in a recording layer according to the present invention. The molar ratio was determined calculating in accordance with the intensity ratio after curve fitting the spectrum curves of $TeO_2$ and Te obtained by XPS spectrum measurement. It is seen from FIG. 9 that the molar ratio of $TeO_2$ to Te in a recording layer obtained when the oxygen content in the gas mixture was 10% (note that the maximum allowable beam intensity for the recording layer in this case is increased by 10%) was about 0.2:1. Also, when the oxygen content in the gas mixture was 60% (note that in this case the maximum allowable beam intensity for the recording layer is increased by about three times as shown in FIG. 6), the molar ratio of $TeO_2$ to Te in the recording layer was about 1.2: 1. These results indicate that if the oxygen content in the gas mixture is selected to be 10 to 60%, the molar ratio of $TeO_2$ to Te in the recording layer is 0.2-1.2:1 and the maximum allowable beam intensity for the recording layer is increased by about 10 to 300%. The CNR can be significantly improved if data readout is performed using a laser beam having such an increased intensity.

Figure 10:
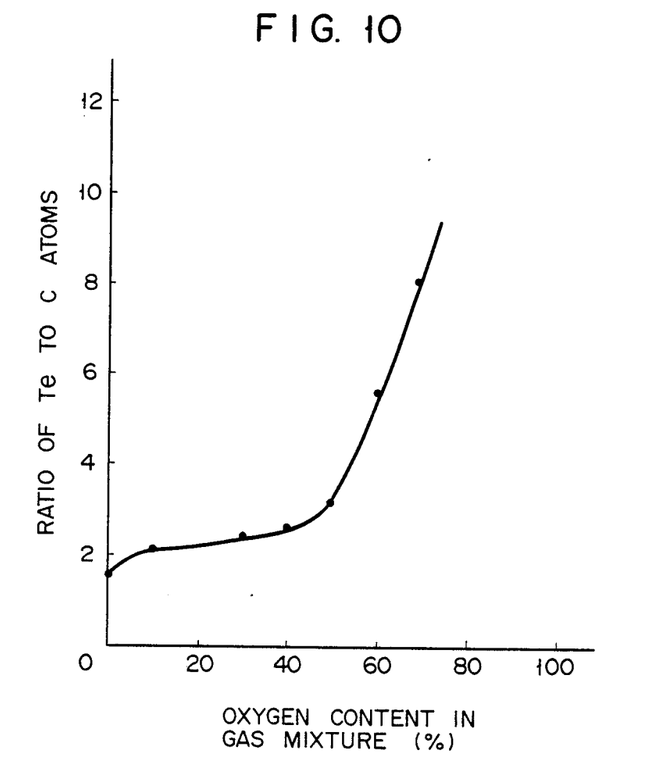
FIG. 10 is a graph showing the relationship between the composition of the gas mixture for plasma sputtering and the ratio of Te atoms to C atoms in an optical disk actually manufactured.

FIG. 10 shows the relationship between the oxygen content in the gas mixture and the ratio of Te atoms to C atoms contained in the recording layer according to the present invention. The relationship shown in FIG. 10 is plotted in accordance with the measurement results obtained by actual chemical analysis of the recording layers formed following the same procedures as in Example 1. According to the results shown in FIG. 10, when the oxygen content in the gas mixture is set to be 10 to 60% and the maximum allowable beam intensity for the recording layer is thus improved by about 10 to 300%, the ratio of Te to C atoms in the recording layer is 2-6:1.

Although the present invention has been shown and described with reference to particular embodiments, various changes and modifications which are obvious to a person skilled in the art to which the invention pertains are deemed to lie within the scope of the invention.

What is claimed is:

1. A recording medium, comprising:
    (a) a substrate; and
    (b) a photosensitive recording layer formed on said substrate, said recording layer comprising,
    a hydrocarbon matrix,
    low-melting-point metal clusters dispersed in said matrix, the low-melting-point metal of said clusters selected from the group consisting of tellurium, indium, bismuth, lead, arsenic, and selenium, and
    metal oxide clusters dispersed in said matrix for thermally stabilizing said matrix and for improving the heat resistance of said recording layer, the metal of said oxide clusters selected from the group consisting of tellurium, indium, bismuth, lead, arsenic, and selenium.

2. The recording medium according to claim 1, wherein said metal oxide clusters comprise an oxide of a metal constituting said low-melting-point metal clusters.

3. The recording medium according to claim 2, wherein said metal oxide clusters comprise tellurium oxide clusters and said low-melting-point metal clusters comprise tellurium metal clusters.

4. The recording medium according to claim 3, wherein the number of tellurium atoms contained in said recording layer is set to exceed the number of carbon atoms contained in said matrix.

5. The recording medium according to claim 4, wherein a ratio of the number of tellurium atoms to the number of carbon atoms in said recording layer is set to be not less than 2 to 1.

6. The recording medium according to claim 4, wherein a ratio of the number of tellurium atoms to the number of carbon atoms in said recording layer is 2-6 to 1.

7. The recording medium according to claim 4, wherein molar ratio of the tellurium oxide clusters to the tellurium clusters in said recording layer is set to be not less than 0.1 to 1.

8. The recording medium according to claim 4, wherein molar ratio of the tellurium oxide clusters to the tellurium clusters in said recording layer is 0.1-1.2 to 1.

9. A recording medium comprising:
(a) a substrate; and
(b) a photosensitive recording layer formed on said substrate, said recording layer comprising;
a hydrocarbon matrix,
tellurium metal clusters dispersed in said matrix, and
metal oxide clusters dispersed in said matrix for thermally stabilizing said matrix and for improving the heat resistance of said recording layer, the metal of said oxide clusters being selected from the group consisting of tellurium, indium, bismuth, lead, arsenic, and selenium.

10. The recording medium according to claim 9, wherein the number of tellurium atoms in said recording layer is set to exceed the number of carbon atoms in said matrix.

11. The recording medium according to claim 10, wherein the ratio of the number of carbon atoms in said recording layer is set at not less than 2 to 1.

12. The recording medium according to claim 10, wherein the ratio of the number of carbon atoms in said recording layer is 2-6 to 1.

13. The recording medium according to claim 10, wherein the molar ratio of the tellurium oxide clusters to the tellurium clusters in said recording layer is set at not less than 0.1 to 1.

14. The recording medium according to claim 10, wherein the molar ratio of the tellurium oxide clusters to the tellurium clusters in said recording layer is 0.1-1.2 to 1.

* * * * *